(12) United States Patent
Killingbeck et al.

(10) Patent No.: US 10,792,737 B1
(45) Date of Patent: Oct. 6, 2020

(54) CUTTING MACHINE AND METHOD

(71) Applicant: Caterpillar Inc., Deerfield, IL (US)

(72) Inventors: Jeremy Killingbeck, Greenwood, IN (US); Kyle R. Corn, Flat Rock, IN (US); Timothy S. Graham, Golden, MS (US); Gregory L. Lambert, Corinth, MS (US)

(73) Assignee: Caterpillar Inc., Peoria, IL (US)

( * ) Notice: Subject to any disclaimer, the term of this patent is extended or adjusted under 35 U.S.C. 154(b) by 31 days.

(21) Appl. No.: 16/356,571

(22) Filed: Mar. 18, 2019

(51) Int. Cl.
*B23B 41/12* (2006.01)
*B23C 3/34* (2006.01)
*B23Q 17/24* (2006.01)

(52) U.S. Cl.
CPC ............ *B23B 41/12* (2013.01); *B23C 3/34* (2013.01); *B23Q 17/24* (2013.01)

(58) Field of Classification Search
CPC ....... B23B 41/12; B23B 47/281; B23B 27/20; B23B 2215/24; B23C 3/34; B23C 2215/24; B23Q 17/24
See application file for complete search history.

(56) References Cited

U.S. PATENT DOCUMENTS

| | | | | |
|---|---|---|---|---|
| 1,558,045 A | * | 10/1925 | Robertson | B23B 41/12 408/105 |
| 4,132,494 A | * | 1/1979 | Aldridge, Jr. | B23B 41/12 269/73 |
| 4,234,275 A | * | 11/1980 | Clement | B23B 41/12 248/646 |
| RE31,859 E | * | 4/1985 | Aldridge, Jr. | B23B 41/12 269/73 |
| 4,730,958 A | * | 3/1988 | Banoczky | B23B 41/12 408/116 |
| 4,789,279 A | * | 12/1988 | Rottler | B23B 41/12 269/296 |
| 4,932,814 A | * | 6/1990 | York | B23B 29/02 29/26 B |
| 8,925,198 B2 | | 1/2015 | Nagel et al. | |
| 2008/0115856 A1 | * | 5/2008 | Altenhoner | B23Q 17/2233 144/136.1 |
| 2013/0337215 A1 | | 12/2013 | Sharp et al. | |
| 2016/0177869 A1 | | 6/2016 | Taenzer et al. | |
| 2017/0282259 A1 | * | 10/2017 | Habel | G01N 3/30 |

FOREIGN PATENT DOCUMENTS

| | | | |
|---|---|---|---|
| CN | 104786003 B | 4/2018 | |
| GB | 291766 A | * 10/1928 | ............ B23B 41/12 |
| JP | 2002227823 A | 8/2002 | |

* cited by examiner

*Primary Examiner* — Alan Snyder
(74) *Attorney, Agent, or Firm* — Bookoff McAndrews

(57) ABSTRACT

A cutting tool for removing material from an engine block structure includes an engine block structure support sized to receive the engine block structure, a platform having a longitudinal dimension and a width dimension, and a cutting assembly supported on the platform and movable in a longitudinal direction along an adjustable rail, and movable in a direction approximately orthogonal to the longitudinal direction, the cutting assembly including a rotary cutter. The cutting tool also includes an alignment mechanism including an engagement structure configured to secure the cutting assembly to one of a plurality of predetermined positions on the adjustable rail, and an adjustment mechanism for moving the adjustable rail and cutting assembly in the longitudinal direction to position the rotary cutter to a desired position.

20 Claims, 5 Drawing Sheets

CUTTING MACHINE AND METHOD

TECHNICAL FIELD

The present disclosure relates generally to a cutting machine, and more particularly, to a cutting machine for cutting a groove in a workpiece.

BACKGROUND

Internal combustion engines are useful in various applications, including propulsion, electricity generation, and operation of heavy machinery. Internal combustion engines include one or more pistons that each reciprocate within a piston cylinder. A crankshaft, typically located below the piston cylinders, is connected to one or more pistons and translates the reciprocating motion of the pistons into rotational motion. The crankshaft is housed within a engine block and rotates on one or more oil-lubricated bearings within the engine block. These crankshaft bearings may be plain or slide bearings that provide a smooth circumferential surface that supports the crankshaft within a crankshaft bearing bore. The bearings may be coated with, or fabricated from, a material that presents a low-friction surface to the crankshaft.

Each crankshaft bearing may be formed as an approximately semi-circular surface and may include an outer protrusion or tab that is received by a corresponding bearing groove cut into in a crankshaft saddle of the engine block. This tab may be localized at one of the ends of the bearing. Alternatively, the tab may extend along an entire outer periphery (about 180°) of each bearing. The tab of the bearing and the bearing groove of the crankshaft saddle in the engine block may form closely mated surface that facilitate correct insertion and positioning of the bearings. Thus, the tab in the bearings may require tight tolerancing with the bearing groove to ensure that each bearing is placed in the correct location during assembly of the internal combustion engine.

One process of remanufacturing engine blocks includes separating two halves of the engine block and adding material over substantially the entire interior surface of the engine block, including the crankshaft saddles. Thus, the bearing grooves in the crankshaft saddles that were initially present may become reduced in size to the extent that they are no longer usable with the tab of the bearings.

An exemplary honing tool for creating a crankshaft bearing bore is disclosed in U.S. Pat. No. 8,925,198 ("the '198 patent") to Nagel et al. The honing tool disclosed in the '198 patent is an elongated-cylindrical tool which is inserted into a crankshaft bearing bore. The honing tool is used to hone a crankshaft bearing bore to a desired size and finish. While the honing tool described in the '198 patent may be useful in some circumstances, it may not provide accuracy required in the remanufacturing of a bearing groove in a crankshaft saddle of an engine block.

The disclosed cutting machine and method may solve one or more of the problems set forth above and/or other problems in the art. The scope of the current disclosure, however, is defined by the attached claims, and not by the ability to solve any specific problem.

SUMMARY

In one aspect, a cutting tool for removing material from an engine block may include an engine block structure support sized to receive the engine block structure, a platform having a longitudinal dimension and a width dimension, and a cutting assembly supported on the platform and movable in a longitudinal direction along an adjustable rail, and movable in a direction approximately orthogonal to the longitudinal direction, the cutting assembly including a rotary cutter. The cutting tool may also include an alignment mechanism including an engagement structure configured to secure the cutting assembly to one of a plurality of predetermined positions on the adjustable rail, and an adjustment mechanism for moving the adjustable rail and cutting assembly in the longitudinal direction to position the rotary cutter to a desired position.

In another aspect, a cutting tool for removing material from an engine block structure may include an engine block structure support sized to receive the engine block structure, a platform having a longitudinal dimension and a width dimension, and a cutting assembly supported on the platform and movable in a longitudinal direction along an adjustable rail, and movable in a direction approximately orthogonal to the longitudinal direction, the cutting assembly including a rotary cutter. The cutting tool may also include an alignment mechanism including an engagement structure configured to secure the cutting assembly to one of a plurality of predetermined positions on the adjustable rail, an adjustment mechanism for moving the adjustable rail and cutting assembly in the longitudinal direction to position the rotary cutter to a desired position, and a camera and display system showing a position of the engine block structure with respect to the rotary cutter.

In yet another aspect, a cutting tool for removing material from a crankshaft saddle of a crankcase portion of an engine block may include a support sized to receive the crankcase portion, a platform having a longitudinal dimension and a width dimension, and a cutting assembly supported on the platform and movable in a longitudinal direction along an adjustable rail, and movable in a direction approximately orthogonal to the longitudinal direction, the cutting assembly including a rotary cutter. The cutting tool may also include an alignment mechanism including an alignment pin configured to secure the cutting assembly to one of a plurality of predetermined positions on the adjustable rail, the plurality of predetermined positions corresponding to positions of a plurality of crankshaft saddles of the crankcase portion, an adjustment mechanism for moving the adjustable rail and cutting assembly in the longitudinal direction to position the rotary cutter to align the rotary cutter with bearing grooves of one of the crankshaft saddles, and a camera and display system showing a position of the bearing groove with respect to the rotary cutter.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
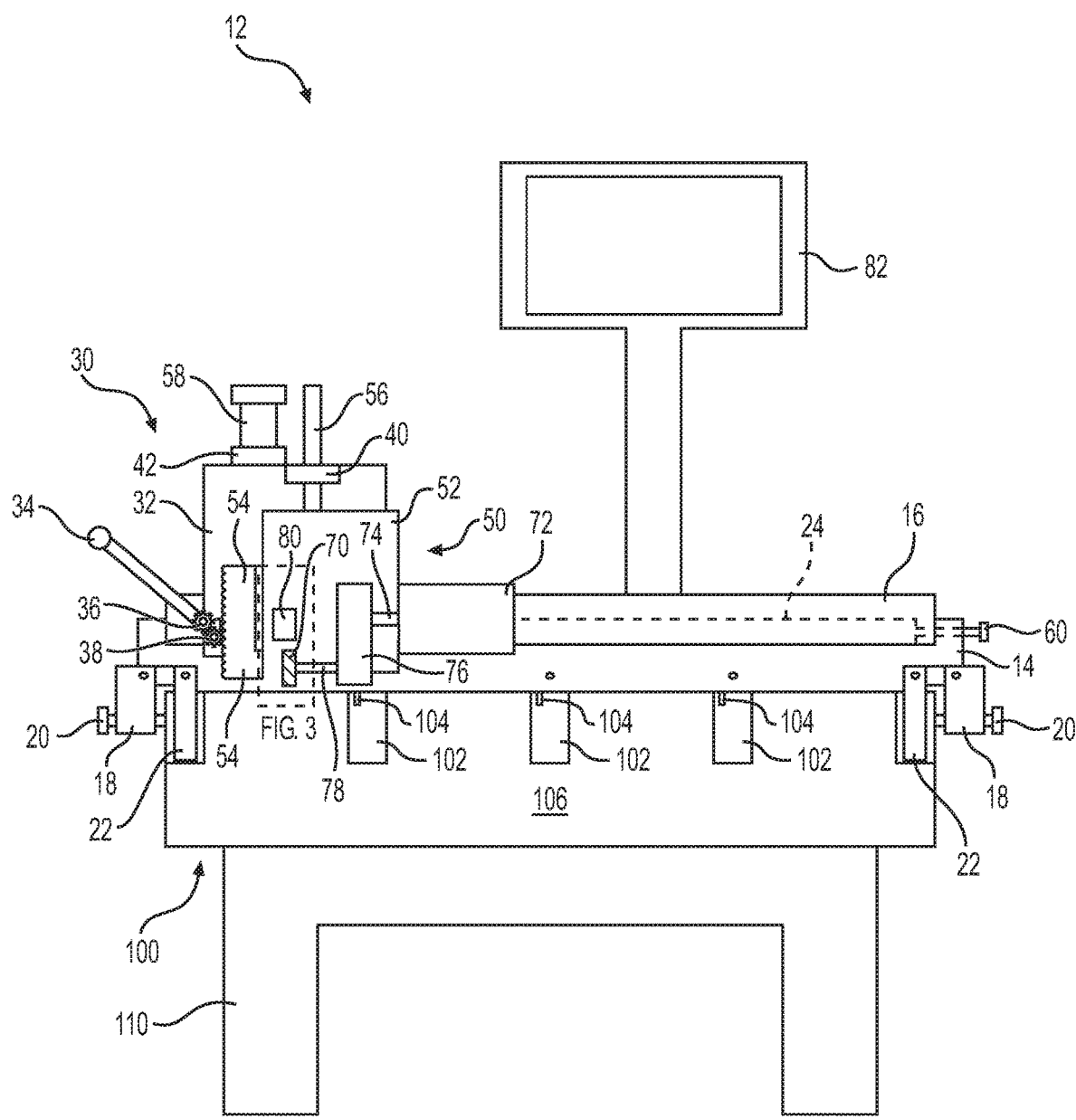
FIG. 1 is a partially schematic front view of a cutting machine for removing material from an engine block according to aspects of the disclosure.

FIG. 1 illustrates an exemplary cutting tool or cutting machine 12 for cutting a groove 104 in an engine block structure 100 of an internal combustion engine. In one example, cutting machine 12 may be used for locating and cutting a bearing groove 104 in the engine block structure 100 as part of a remanufacturing process of the engine block. For example, engine block structure 100 may be a crankcase portion 106, and a rotary cutter or cutting tool 70 may be used to cut a bearing groove 104 in a crankshaft saddle 102 of the crankcase portion 106 of the engine block structure 100.

Engine block structure 100 may include a plurality of crankshaft saddles 102, and each crankshaft saddle 102 may include a semicircular-shaped support surface that receives thereon a semicircular bearing (not shown) for the crankshaft. The semicircular bearings each include a locating tab that protrudes from an outer surface thereof, and is received in a corresponding bearing groove 104 in a crankshaft saddle 102. During a remanufacturing process of the engine block structure 100, the bearing grooves 104 may be altered, for example by material being added to the engine block, so that the bearing locating tabs no longer fit in the bearing grooves 104 of the crankshaft saddle 102. The added material may include, for example, a thermal spray, such as plasma transferred wire arc thermal spray. Cutting tool 70 may include, for example, a rotary tool configured to remove added material from each of the crankshaft saddles 102, thereby re-machining the bearing groove 104 so that the locating tabs of the crankshaft bearing can be properly received in the bearing grooves 104.

As shown in FIG. 1, cutting machine 12 may include an engine block support structure 110 sized to receive the engine block structure 100. Engine block support structure 110 may include a table that supports the components of the cutting machine 12 as well as engine block structure 100. Cutting machine 12 may further include a vertically-fixed guiding assembly 30 and a vertically-movable cutting assembly 50. A platform 14 of cutting machine 12 may support assemblies 30 and 50 on a longitudinally-extending fixed rail 16 and an adjustable rail 24 that extends approximately parallel to fixed rail 16. Platform 14 may have a longitudinal dimension extending approximately parallel to fixed rail 16 and adjustable rail 24 and a width dimension that extends approximately orthogonal to the longitudinal dimension. A camera 80 supported on vertically-movable assembly 50 may be directed toward cutting tool 70 and be operably connected to a display 82 so as to form a camera and display system. Display 82 may be supported on a separate stand structure, or extend from platform 14. Platform 14 may also support a block positioning structure including a pair of opposed positioning arms 18, and one or more arc-shaped alignment arms 22, each configured to assist in locating and securing the engine block to the cutting machine 12.

An upper surface of platform 14 may support fixed rail 16, adjustable rail 24, and an adjustment mechanism 94 attached to rail 24, such as a rod having a threaded distal end. Fixed rail 16 and adjustable rail 24 support guiding assembly 30 and cutting assembly 50 in a longitudinally slidable manner. In one aspect, guiding assembly 30 and cutting assembly 50 may move together as a unit in a horizontal (longitudinal or length) direction along fixed rail 16 and adjustable rail 24. As described in further detail below, cutting assembly 50 may be translated in a vertical direction approximately orthogonal to the longitudinal direction, while guiding assembly 30 is fixed with respect to a vertical direction.

The pair of positioning arms 18 are connected to opposing end portions of a side, upper, and/or lower surface of platform 14. A pair of positioning fasteners 20, such as thumbscrews, extend within a threaded hole within each positioning arm 18. These positioning fasteners 20 may be configured to abut end wall surfaces of the engine block structure 100 to ensure that cutting machine 12 is fixedly secured to engine block structure 100. The alignment arms 22 may also be connected to the side surface of platform 14, or to a lower surface of platform 14. Each alignment arm 22 may have an arc-shaped lower surface that is complementary to a crankshaft saddle 102 so that the alignment arms can be located within a crankshaft saddle 102. This arc-shaped surface of alignment arm 22 may be configured to secure cutting machine 12 to engine block structure 100 in a horizontal or width direction orthogonal to the sliding or length direction of assemblies 30 and 50. Each alignment arm 22 may be removably secured to platform 14 by one or more bolts to facilitate cutting operations in the crankshaft saddles provided at the end portions of engine block structure 100.

Guiding assembly 30 may provide a vertically-fixed guiding structure for the vertically-movable components of cutting assembly 50. As shown in FIG. 1, guiding assembly 30 includes a support structure 32 that may be formed by one or more plates. Support structure 32 may support a lever 34 and gears 36 and 38. Lever 34 may be connected with first gear 36 via a shaft extending through a proximal end of the handle to define an axis of rotation of first gear 36. First gear 36 may mesh with second gear 38, which may form a pinion gear. A guide member 40 and a stop member 42 may be provided at an upper portion of support structure 32. Guide member 40 may include a through-hole shaped to receive a guide rod 56 of cutting assembly 50 via a bearing, for example. Stop member 42 may similarly include a through-hole for receiving limit cylinder 58.

Cutting assembly 50 may include a support structure 52 formed by one or more plates that support a rack plate 54, guide rod 56, limit cylinder 58, cutting tool 70, tool motor 72, a drive chain or belt 76 and camera 80. Cutting tool 70 may be supported at a lower end of cutting assembly 50 and includes a driven shaft 78 that defines an axis of rotation of cutting tool 70. Driven shaft 78 may be connected to a drive chain 76 which is driven by a tool motor 72 via drive shaft 74. Cutting assembly 50 may be connected to guiding assembly 30 via guide rod 56 and limit cylinder 58 such that assemblies 30 and 50 are movable together in a horizontal or longitudinal direction parallel to rails 16 and 24.

Rack plate 54 may be fixedly supported at a side portion of support structure 52 to mesh with pinion gear 38 of guiding assembly 30. Together, rack plate 54 and pinion gear 38 may form a rack and pinion mechanism that translates motion of lever 34 into vertical motion of cutting assembly 50.

Guide member 40 may extend from an upper portion of the support structure 32 of guiding assembly 30 to receive guide rod 56 in a vertically-slidable manner. Guide rod 56 may extend within a through-hole of guide member 40 that accommodates guide rod 56 (e.g., via a slide bearing). Cutting assembly 50 may also include a limit cylinder 58 connected to support structure 52. Limit cylinder 58 may be provided with a stop portion at a predetermined length that corresponds to the maximum cutting depth, in the vertical direction, of cutting tool 70.

Figure 2:
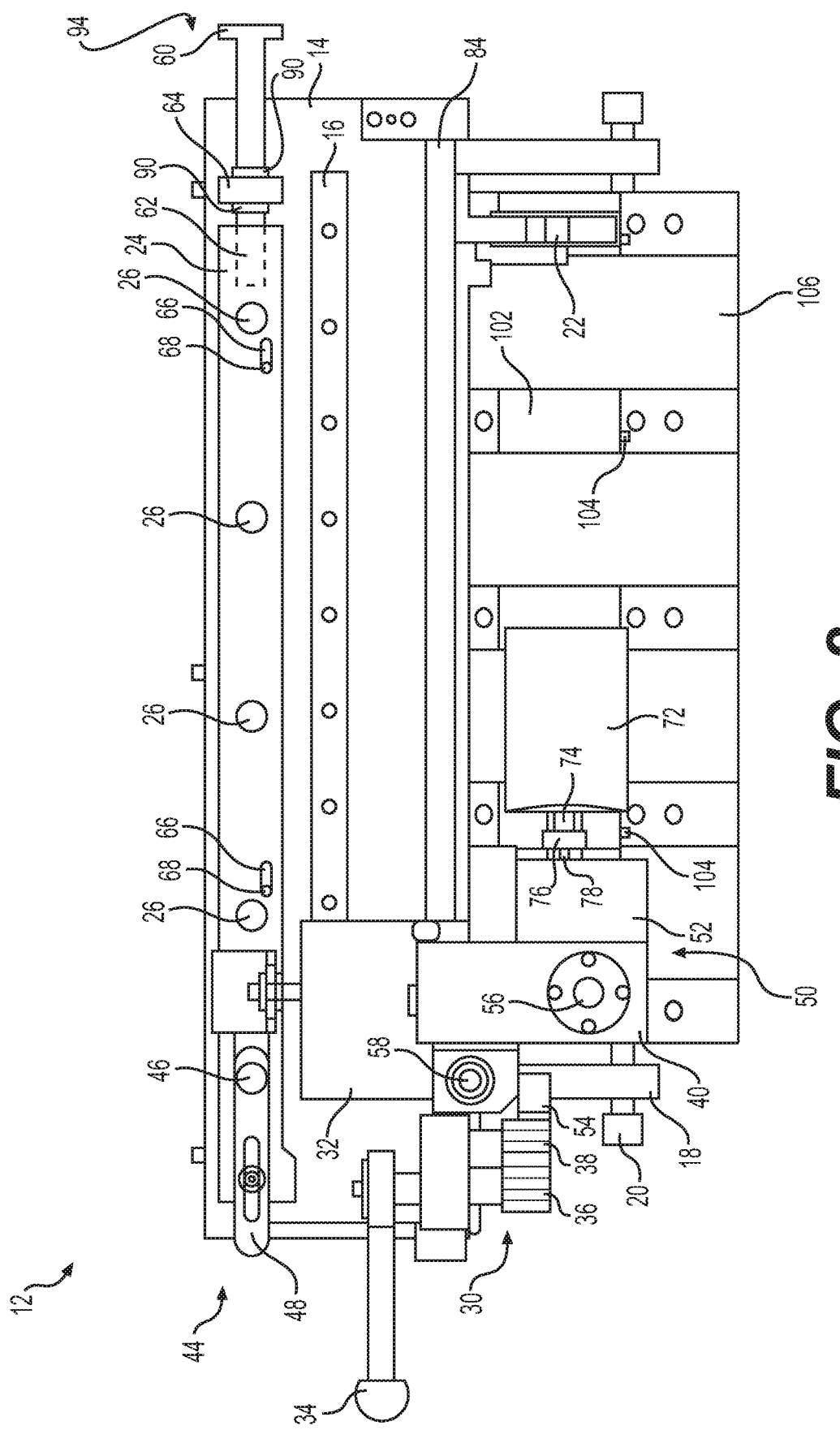
FIG. 2 is a top view of the cutting machine and engine block of FIG. 1.

FIG. 2 is a top view illustrating the cutting machine 12 and engine block crankcase portion 106 of FIG. 1. Fixed rail 16 and adjustable rail 24, together with a support rail 84, may support the weight of guiding assembly 30 and cutting assembly 50, as well as provide guides for the sliding movement of assemblies 30 and 50. Adjustable rail 24 may be located at a rear portion of platform 14 and includes a series of detents or holes 26 at predetermined intervals. Thus, detents 26 may correspond to a plurality of predetermined positions on adjustable rail 24. Each detent 26 may be provided at a location that positions assemblies 30 and 50 at a generally aligned position relative to a crankshaft saddle 102. Thus, detents 26 generally align cutting tool 70 and a bearing groove 104.

Cutting machine 12 may include an alignment mechanism 44 that is configured to releasably fix assemblies 30 and 50 to adjustable rail 24 at detents 26. When assemblies 30 and 50 are secured to adjustable rail 24 via alignment mechanism 44, an adjustment mechanism 94 may be used to fine tune the horizontal position of assemblies 30 and 50 by moving the adjustable rail 24.

With continued reference to FIG. 2, alignment mechanism 44 may be fixedly connected to a rear portion of support structure 32 of guiding assembly 30 via one or more bolts, plates, and/or brackets. Alignment mechanism 44 may secure assemblies 30 and 50 to adjustable rail 24 by an engagement structure 46 that is movable in to and out from each detent 26 via the operation of an alignment lever 48. In one example, engagement structure 46 may include an alignment pin having a shape that corresponds to each detent 26. Alignment lever 48 of the alignment mechanism 44 may be movable or pivotable in a vertical direction to lift and lower engagement structure 46 relative to adjustable rail 24. Alignment mechanism 44 may include a spring that biases engagement structure 46 downward toward adjustable rail 24.

An adjustment mechanism 94 may be provided at a longitudinal end of adjustable rail 24 opposite to alignment mechanism 44 to facilitate adjustment of the rail 24. Adjustment mechanism 94 may include an adjustment member 60, threaded distal end 62 of adjustable rail 24, an adjustment guide 64. Adjustment member 60 may be coupled to the longitudinal end of adjustable rail 24 and to platform 14 by adjustment guide 64. In an exemplary configuration, adjustment member 60 may include a rod having a threaded distal end 62. Threaded distal end 62 may be received within a corresponding internally-threaded hole in the longitudinal end of adjustable rail 24 to allow translation of adjustable rail 24 with respect to platform 14 and fixed rail 16 when adjustment member 60 is rotated. The threading provided on distal end 62 and the threaded hole of adjustable rail 24 may be sufficiently fine so as to facilitate precise positioning of rail 24.

A non-threaded portion of adjustment member 60 may extend through adjustment guide 64 to prevent translation of adjustment mechanism 60 during rotation of member 60. In an exemplary configuration, adjustment member 60 may be provided with a pair of annular flanges 90 that are secured to the non-threaded portion of adjustment member 60. In one aspect, adjustment guide 64 may include a vertically-open or horizontally-open slot that facilitates insertion of adjustment member 60 into guide 64. Thus, when assemblies 30 and 50 are fixed to adjustable rail 24 via alignment mechanism 44, assemblies 30 and 50 may be adjusted with adjustable rail 24.

Adjustable rail 24 may include one or more oblong holes 66 that receive a respective positioning stop pin 68 to limit an amount of travel of adjustable rail 24. In one aspect, adjustable rail 24 may be adjustable via oblong holes 66 by an amount approximately equal to a width of each crankshaft saddle 102. Thus, cutting tool 70 may be aligned with each crankshaft saddle 102 at any desired location. However, a greater or lesser range of motion is also possible. Adjustable rail 24 may be removable, e.g., along a longitudinal direction, so as to allow insertion of a different adjustable rail 24 with different detent spacing that are positioned to correspond with a new location of bearing grooves (on either a proximal or distal side of each crankshaft saddle 102). The removal of adjustable rail 24 may also facilitate the assembly of adjustable rail and adjustment member 60.

Figure 3:
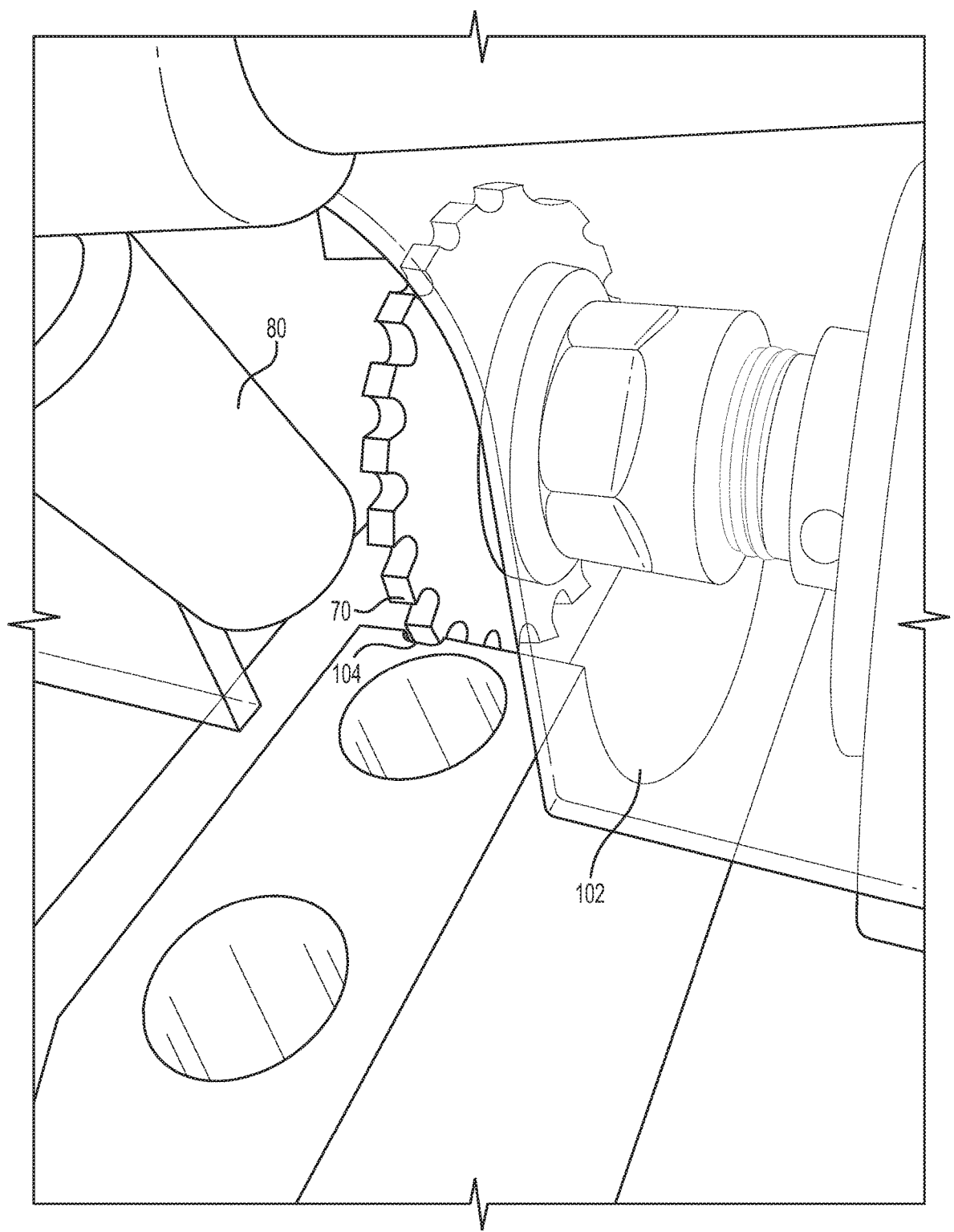
FIG. 3 is an enlarged perspective view of the cutting machine of FIG. 1.
Figure 4A:
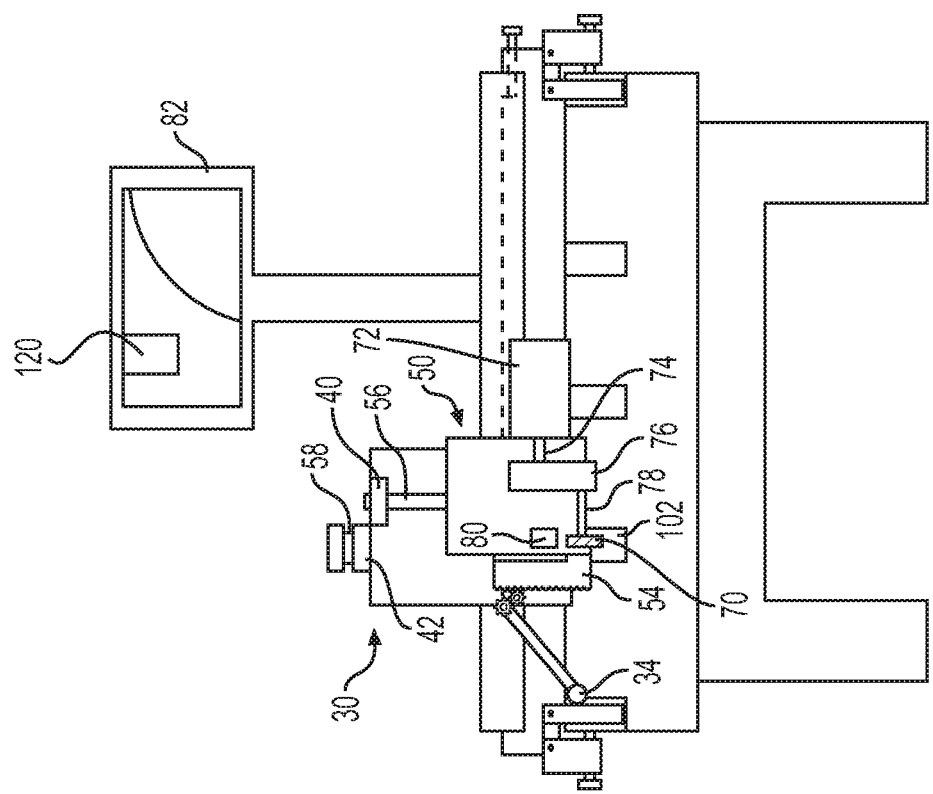
FIGS. 4A and 4B are partly schematic front views of the cutting machine of FIG. 1.
Figure 4B:
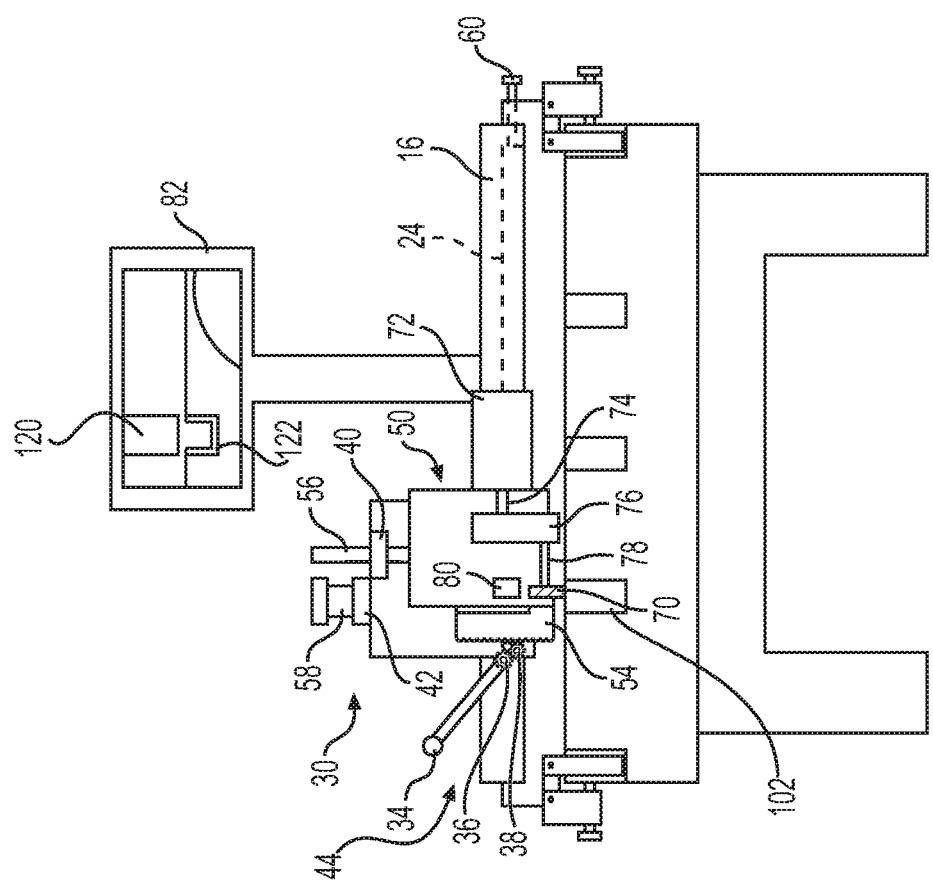

FIG. 3 is an enlarged perspective view of a portion of FIG. 1 including cutting tool 70 and camera 80 of cutting machine 12. As shown in FIG. 3, camera 80 may be directed so as to have a line of sight directed toward a rotary tool formed by cutting tool 70. This line of sight may extend approximately orthogonal to the axis of rotation of rotary cutter 70. Camera 80 may be directed or angled toward bearing groove 104, such that both cutting tool 70 and bearing groove 104 in crankshaft saddle 102 are within a field of vision detected by camera 80. Thus, an image detected by camera 80 and displayed on display 82 includes images of both the cutting tool 70 and bearing groove 104 (FIGS. 4A and 4B). Camera 80 may include optics (e.g., one or more lenses) that magnify an image captured by camera 80. Furthermore, camera 80 may be angled toward crankshaft saddle 102 such that cutting tool 70 does not obscure bearing groove 104 (FIGS. 4A and 4B).

INDUSTRIAL APPLICABILITY

The disclosed aspects of cutting machine 12 may be used to remove material from upper and/or lower portions of engine blocks during a remanufacturing process. Cutting machine 12 described herein may provide for a precise cutting operation in situations where a CNC process may not be possible. Cutting machine 12 may also facilitate accurate machining of a engine block within tight tolerances, thus allowing salvaging of engine blocks that would otherwise be scrapped.

FIGS. 4A and 4B are partly schematic front views illustrating an operation of the cutting machine 12 of FIG. 1. Throughout the operation of cutting machine 12, display 82 may continuously display real-time video captured by camera 80. While display 82 is depicted as facing toward a front of cutting machine 12 in FIGS. 1 and 4A, display 82 may be positioned facing other directions with respect to cutting machine 12 to assist the operator in fine alignment performed with adjustment member 60.

FIG. 4A illustrates cutting machine 12 after guiding assembly 30 and cutting assembly 50 are moved from the position shown in FIG. 1 via sliding motion along rails 16 and 24. After this sliding motion, assemblies 30 and 50 may be secured in this position, which generally aligns cutting tool 70 with a bearing groove 104, alignment mechanism 44 (FIG. 2). FIG. 4B illustrates a movement of cutting assembly 50 in a vertical direction orthogonal to the sliding direction of assemblies 30 and 50. Lever 34 may be lowered as shown in FIG. 4B to draw cutting assembly 50, including cutting tool 70 and camera 80, downward toward engine block structure 100.

As noted above, securing assemblies 30 and 50 in the horizontal position shown in FIG. 4A may be achieved by operation of the alignment mechanism 44. For example, referring to FIG. 2, depressing alignment lever 48, which is provided at an opposite end with respect to engagement structure 46, may lift engagement structure 46 out of a detent 26 of adjustable rail 24, thereby allowing for sliding movement of assemblies 30 and 50. Once assemblies 30 and 50 are generally aligned in a desired position adjacent a crankshaft saddle 102, alignment lever 48 may be released or lifted to lower engagement structure 46 into a corresponding detent 26 of adjustment rail 24. As detents 26 may be provided at locations corresponding to predetermined positions on adjustable rail 24, alignment mechanism 44 may secure cutting assembly 50 to one of these predetermined positions on adjustable rail 24.

Once assemblies 30 and 50 are secured to adjustable rail 24 with alignment pin 46 and detent 26, adjustment member 60 may be employed to precisely adjust the position of adjustable rail 24 so that cutting tool 70 lines up accurately with bearing groove 104. For example, by rotating adjustment member 60, the threaded distal end 62 thereof may rotate with the internally-threaded hole at the longitudinal end of adjustable rail 24. During this rotation, adjustment guide 64 and flanges 90 (FIG. 2) may prevent motion of adjustment member 60 in the horizontal direction. Thus, adjustable rail 24 and assemblies 30, 50 may be gradually translated in the horizontal direction. An amount of motion of adjustable rail 24 and assemblies 30 and 50 via adjustment member 60 may be limited by oblong holes 66 and positioning stop pins 68 (FIG. 2) or another stop mechanism.

During the adjustment of adjustable rail 24 via adjustment member 60, camera 80 may capture a magnified real-time video image which is displayed on display 82. Due to the positioning of camera 80 on cutting assembly 50, camera 80 moves with cutting tool 70 in the horizontal and vertical directions. Accordingly, an image 120 of the cutting tool 70 may remain constant during the sliding motion and subsequent adjustment of assemblies 30, 50. During adjustment via adjustment member 60, an image 122 of one of the crankshaft saddles 102, including an image of a bearing groove 104 therein, may shift in accordance with the slight horizontal motion of cutting tool 70 and camera 80 with rail 24. Once cutting tool 70 is precisely aligned with bearing groove 104, the image 120 of cutting tool will be aligned with the image 122 of bearing groove 104. As shown, an alignment between cutting tool 70 and bearing groove 104 may be achieved by aligning a center of cutting tool 70 with a center of the bearing groove 104. As extra material received within bearing groove 104, as a part of the remanufacturing process, provides bearing groove 104 with a smaller width as compared to the width of the cutting tool 70, a width of cutting tool 70 may correspond to the precise width desired in a remanufacturing bearing groove.

Once a desired precise alignment is achieved between cutting tool 70 and bearing groove 104, as may be confirmed via display 82, frictional force between adjustment member 60 and adjustable rail 24 may be sufficient to prevent further horizontal motion of assemblies 30 and 50, even during a cutting process performed by lowering cutting assembly 50. To initiate the cutting process, actuation of lever 34 may cause the rack and pinion mechanism of second gear 38 and rack plate 54 to move cutting assembly 50 in a vertical direction. Lever 34 may be drawn (actuated) downward so as to rotate first gear 36 in a first direction (counterclockwise as shown in FIGS. 4A and 4B). The rotation of first gear 36 may in turn cause second gear 38 to rotate in an opposite direction (clockwise) and move rack plate 54, as well as cause the remaining components of cutting assembly 50 to move downward.

During the manipulation of lever 34 to draw cutting assembly 50 downward, cutting tool 70 is rotated by tool motor 72, which provides rotational motion to cutting tool 70 via drive shaft 74, drive chain 76, and driven shaft 78. Thus, when cutting tool 70 is lowered sufficiently so as to contact bearing groove 104 of crankshaft saddle 102, material may be precisely removed. The downward motion of cutting tool 70 may be limited by contact between limit cylinder 58 of cutting assembly 50 and stop member 42. Thus, a length of limit cylinder 58 may define a depth of bearing groove 104.

Figure 5:
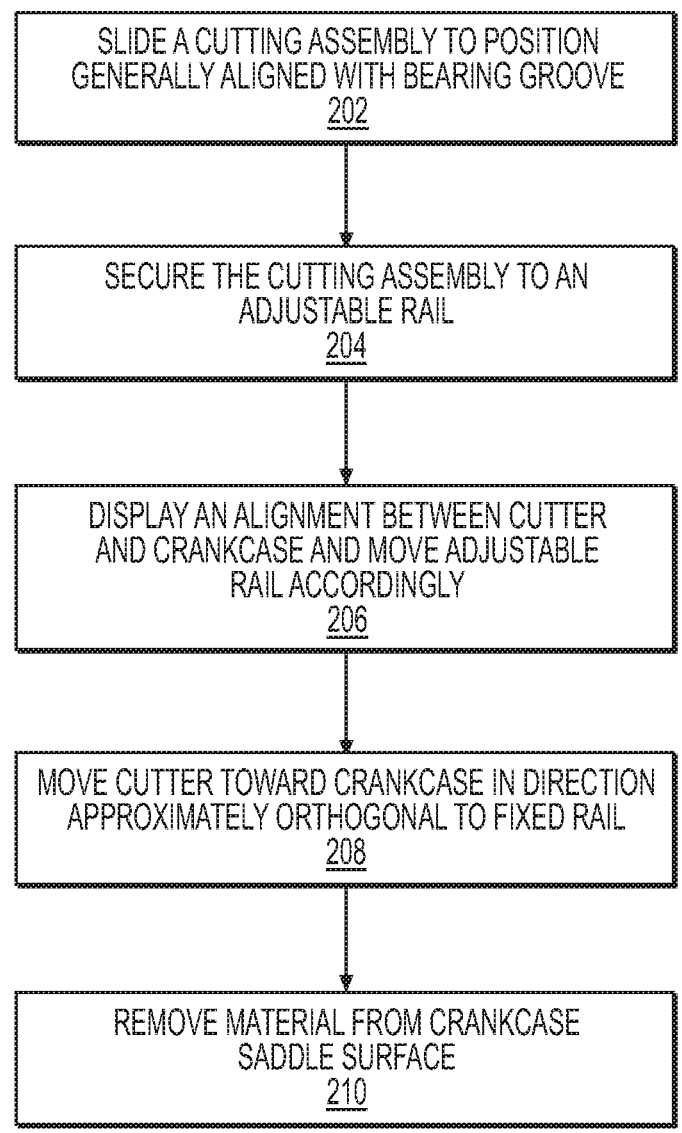
FIG. 5 is a flowchart illustrating an exemplary method according to aspects of the disclosure.

FIG. 5 illustrates a flowchart corresponding to an exemplary method 200 of operation of cutting machine 12 for removing material from a portion of an engine block structure 100 that is secured to cutting machine 12. In an exemplary first step 202 of method 200, cutting assembly 50 (along with guiding assembly 30 and alignment mechanism 44) may be slid horizontally along fixed and adjustable rails 16, 24 to a position at which cutting tool 70 is generally aligned with a bearing groove 104. During step 202 the alignment mechanism 44 is in a disengaged position such that engagement structure 46 is raised out of any detents 26 of adjustable rail 24.

In a step 204 the cutting assembly 50 may be secured with respect to adjustable rail 24. This securing may be achieved, for example, by moving the alignment mechanism 44 into an engaged position so that engagement structure 46 is received in a detent 26.

In a step 206, a position of the engine block structure (e.g., bearing groove 104) with respect to cutting tool 70 may be shown by the camera and display system. In one example, the alignment between rotary cutter or cutting tool 70 and crankshaft saddle 102 may be displayed on display 82. As described above, images 120, 122 of the cutting tool 70 and bearing groove 104 may be displayed in a magnified real-time image showing the alignment between these two parts. Based on the alignment illustrated in step 206, a position of the adjustable rail 24 and the cutting assembly 50 may be accurately adjusted. This fine adjustment may be achieved by manipulating adjustment member 60 in the manner described above.

Step 208 may include moving cutting tool 70 in a vertical direction approximately orthogonal to a longitudinal (horizontal or length) direction of fixed rail 16. Step 208 may include, for example, manipulating lever 34 so as to cause cutting assembly 50 to move in a downward direction while guiding assembly 30 remains fixed with respect to the vertical direction, as shown in FIGS. 4A and 4B.

Step 210 may include removing material from crankshaft saddle 102 with cutting tool 70. The removal of material from crankshaft saddle 102 may include removing material that was added to a bearing groove 104 of crankshaft saddle 102 so as to increase a size of bearing groove 104 and return the bearing saddle 102 to its original tolerances. A width of the resulting bearing groove 104 may be defined by a width of cutting tool 70, while a depth of the bearing groove 104 may be controlled by limit cylinder 58 and stop member 42.

Following the completion of step 210, method 200 may be performed repeatedly for each bearing groove 104 present in engine block structure 100. When a bearing groove 104 is present at a crankshaft saddle 102 at an end of the engine block structure 100, a corresponding alignment arm 22 may be removed and repositioned within an adjacent crankshaft saddle 102, for example.

The cutting machine 12 may precisely machine crankshaft saddles 102 of a engine block structure 100, such as the crankcase portion 106 of an engine block structure 100. Cutting tool 70 may be aligned with a bearing groove 104 by adjusting a position of adjustable rail 24 after securing cutting assembly 50 thereto. Display 82 provides an image showing the alignment between the cutting tool 70 and an existing bearing groove 104. By aligning an image 120 of the cutting tool 70 with an image 122 of the bearing groove 104, the rotary cutter or cutting tool 70 may re-cut a bearing groove to factory specifications. An enlarged display image provided by cutting machine 12 may further improve the precision of the positioning of the cutting tool 70. Adjustment member 60 provides further assistance in achieving a desired alignment between the cutting tool 70 and bearing groove 104.

It will be apparent to those skilled in the art that various modifications and variations can be made to the disclosed combustion system without departing from the scope of the disclosure. Other embodiments of the cutting tool and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A cutting tool for removing material from an engine block structure, comprising:
   an engine block structure support sized to receive the engine block structure;
   a platform having a longitudinal dimension and a width dimension;
   a cutting assembly supported on the platform and movable in a longitudinal direction along an adjustable rail, and movable in a direction approximately orthogonal to the longitudinal direction, the cutting assembly including a rotary cutter;
   an alignment mechanism including an engagement structure configured to secure the cutting assembly to one of a plurality of predetermined positions on the adjustable rail; and
   an adjustment mechanism for moving the adjustable rail and cutting assembly in the longitudinal direction to position the rotary cutter to a desired position.

2. The cutting tool according to claim 1, wherein the engine block structure is a crankcase portion of an engine block.

3. The cutting tool according to claim 2, wherein the rotary cutter is sized to form a bearing groove in a crankshaft saddle of the crankcase portion.

4. The cutting tool according to claim 1, wherein the plurality of predetermined positions correspond to a plurality of detents in the adjustable rail.

5. The cutting tool according to claim 1, wherein the engagement structure includes an alignment pin sized to be received in one of the plurality of detents in the adjustable rail.

6. The cutting tool according to claim 1, wherein the adjustment mechanism includes an adjustment member coupled to a longitudinal end of the adjustable rail and to the platform, the adjustment member configured to move the adjustable rail with respect to the platform.

7. The cutting tool according to claim 1, further including a stop that limits movement of the rotary cutter in the direction approximately orthogonal to the longitudinal direction.

8. The cutting tool according to claim 1, further including a rack and pinion mechanism configured to move the cutting assembly in the direction approximately orthogonal to the longitudinal direction.

9. A cutting tool for removing material from an engine block structure, comprising:
   an engine block structure support sized to receive the engine block structure;
   a platform having a longitudinal dimension and a width dimension;
   a cutting assembly supported on the platform and movable in a longitudinal direction along an adjustable rail, and movable in a direction approximately orthogonal to the longitudinal direction, the cutting assembly including a rotary cutter;
   an alignment mechanism including an engagement structure configured to secure the cutting assembly to one of a plurality of predetermined positions on the adjustable rail;
   an adjustment mechanism for moving the adjustable rail and cutting assembly in the longitudinal direction to position the rotary cutter to a desired position; and
   a camera and display system showing a position of the engine block structure with respect to the rotary cutter.

10. The cutting tool according to claim 9, wherein a camera of the camera and display system is coupled to the cutting assembly to move with the cutting assembly.

11. The cutting tool according to claim 10, wherein a line of sight of the camera extends approximately orthogonal to an axis of rotation of the rotary cutter.

12. The cutting tool according to claim 9, wherein the camera and display system includes optics that magnify a captured image.

13. The cutting tool according to claim 12, wherein the magnified captured image shows a bearing groove of a crankshaft saddle of the engine block structure and the rotary cutter.

14. The cutting tool according to claim 9, wherein the engine block structure is a crankcase portion of an engine block.

15. The cutting tool according to claim 9, wherein the rotary cutter is sized to form a bearing groove in a crankshaft saddle of the crankcase portion.

16. The cutting tool according to claim 9, wherein the plurality of predetermined positions correspond to a plurality of detents in the adjustable rail.

17. The cutting tool according to claim 9, wherein the engagement structure includes an alignment pin sized to be received in one of the plurality of detents in the adjustable rail.

18. The cutting tool according to claim 9, further including an adjustment member coupled to a longitudinal end of the adjustable rail and to the platform, the adjustment member configured to move the adjustable rail with respect to the platform.

19. The cutting tool according to claim 9, further including a rack and pinion mechanism configured to move the cutting assembly in the direction approximately orthogonal to the longitudinal direction.

20. A cutting tool for removing material from a crankshaft saddle of a crankcase portion of an engine block, comprising:
   a support sized to receive the crankcase portion;

a platform having a longitudinal dimension and a width dimension;

a cutting assembly supported on the platform and movable in a longitudinal direction along an adjustable rail, and movable in a direction approximately orthogonal to the longitudinal direction, the cutting assembly including a rotary cutter;

an alignment mechanism including an alignment pin configured to secure the cutting assembly to one of a plurality of predetermined positions on the adjustable rail, the plurality of predetermined positions corresponding to positions of a plurality of crankshaft saddles of the crankcase portion;

an adjustment mechanism for moving the adjustable rail and cutting assembly in the longitudinal direction to position the rotary cutter to align the rotary cutter with bearing grooves of one of the crankshaft saddles; and a camera and display system showing a position of the bearing groove with respect to the rotary cutter.

* * * * *